US011744180B2

(12) United States Patent
Gunda et al.

(10) Patent No.: US 11,744,180 B2
(45) Date of Patent: Sep. 5, 2023

(54) HARVESTER CROP MAPPING

(71) Applicant: DEERE & COMPANY, Moline, IL (US)

(72) Inventors: Rahul Gunda, Pune (IN); Bryan E. Dugas, Napoleonville, LA (US); Bhalchandra Padwal, Mumbai (IN)

(73) Assignee: Deere & Company, Moline, IL (US)

( * ) Notice: Subject to any disclaimer, the term of this patent is extended or adjusted under 35 U.S.C. 154(b) by 534 days.

(21) Appl. No.: 17/027,451

(22) Filed: Sep. 21, 2020

(65) Prior Publication Data

US 2021/0000010 A1      Jan. 7, 2021

Related U.S. Application Data

(63) Continuation-in-part of application No. 15/882,907, filed on Jan. 29, 2018, now Pat. No. 10,827,676.

(51) Int. Cl.
*A01D 41/127* (2006.01)
*G01S 17/89* (2020.01)
(Continued)

(52) U.S. Cl.
CPC ......... *A01D 41/1271* (2013.01); *A01D 45/00* (2013.01); *A01D 47/00* (2013.01); *G01S 17/89* (2013.01)

(58) Field of Classification Search
CPC .... A01D 41/1271; A01D 45/00; A01D 47/00; A01D 41/141; A01D 45/10; G01S 17/89; G01S 17/88
See application file for complete search history.

(56) References Cited

U.S. PATENT DOCUMENTS 3,398,516 A * 8/1968 Quick ................... A01D 41/14
                                          56/15.8
3,448,564 A * 6/1969 Chauffe ................. A01D 45/10
                                          56/DIG. 1
(Continued)

FOREIGN PATENT DOCUMENTS

CN       102523831 A   *  7/2012    ............ A01D 45/10
CN       107343417 A   * 11/2017    ............ A01D 45/10
(Continued)

OTHER PUBLICATIONS

BCC Research, "Brief History of LiDAR, Its Evolution and Market Definition," <https://blog.bccresearch.com/brief-history-of-lidar-evolution-and-market-definition> Mar. 20, 2018.
(Continued)

*Primary Examiner* — Arpad F Kovacs
(74) *Attorney, Agent, or Firm* — Michael Best & Friedrich LLP

(57) ABSTRACT

A control system for a harvester that harvests crop stalks each having a bottom portion and a top portion. The harvester includes a topper that cuts the stalks between the top and bottom portions and a base cutter that cuts the stalks near a ground surface. The control system includes a sensor that senses a first height between the top of the bottom portion and the ground surface, and senses a second height between the bottom of the bottom portion and the ground surface. The controller receives signals representing the sensed first and second heights from the sensor, determines average first and second heights for the stalks over a set time, sends a first signal to the topper to cause movement of the topper to the average first height, and sends a second signal to the base cutter to cause movement of the base cutter to the average second height.

20 Claims, 4 Drawing Sheets

(51) Int. Cl.
  *A01D 47/00* (2006.01)
  *A01D 45/00* (2018.01)

(56) References Cited

U.S. PATENT DOCUMENTS

| | | | |
|---|---|---|---|
| 4,270,337 A * | 6/1981 | Pinto | A01D 45/10 |
| | | | 56/13.9 |
| 5,749,783 A | 5/1998 | Pollklas | |
| 5,995,895 A | 11/1999 | Watt et al. | |
| 6,389,785 B1 | 5/2002 | Diekhans | |
| 8,452,501 B1 | 5/2013 | Lange et al. | |
| 9,226,449 B2 | 1/2016 | Bischoff | |
| 9,320,196 B2 | 4/2016 | Dybro et al. | |
| 9,629,308 B2 | 4/2017 | Scholer et al. | |
| 9,668,420 B2 | 6/2017 | Anderson et al. | |
| 9,723,784 B2 | 8/2017 | Bremer et al. | |
| 9,807,933 B2 | 11/2017 | Boyd et al. | |
| 9,915,952 B2 | 3/2018 | Dollinger et al. | |
| 10,254,147 B2 | 4/2019 | Vermue et al. | |
| 10,318,138 B2 | 6/2019 | Scholer et al. | |
| 10,371,561 B2 | 8/2019 | Darr et al. | |
| 10,966,369 B2 | 4/2021 | Suleman | |
| 2003/0004630 A1 | 1/2003 | Beck | |
| 2003/0075145 A1 | 4/2003 | Sheidler et al. | |
| 2003/0187560 A1 | 10/2003 | Keller et al. | |
| 2004/0186597 A1 | 9/2004 | Wippersteg et al. | |
| 2005/0279070 A1 | 12/2005 | Pirro et al. | |
| 2006/0026939 A1 | 2/2006 | Kormann | |
| 2007/0056258 A1 | 3/2007 | Behnke | |
| 2008/0155953 A1 * | 7/2008 | Cleodolphi | A01D 41/141 |
| | | | 56/10.2 E |
| 2009/0037059 A1 | 2/2009 | Huster et al. | |
| 2010/0036696 A1 | 2/2010 | Lang et al. | |
| 2011/0205084 A1 | 8/2011 | Morselli et al. | |
| 2013/0116894 A1 * | 5/2013 | Perez-Iturbe | A01D 41/141 |
| | | | 701/50 |
| 2013/0184944 A1 | 7/2013 | Missotten et al. | |
| 2013/0205733 A1 | 8/2013 | Peters et al. | |
| 2013/0211658 A1 | 8/2013 | Bonefas | |
| 2013/0211675 A1 | 8/2013 | Bonefas | |
| 2014/0083556 A1 | 3/2014 | Darr et al. | |
| 2014/0215984 A1 | 8/2014 | Bischoff | |
| 2014/0224377 A1 | 8/2014 | Bonefas | |
| 2014/0230391 A1 * | 8/2014 | Hendrickson | G01N 33/0098 |
| | | | 702/2 |
| 2014/0236381 A1 * | 8/2014 | Anderson | A01B 79/005 |
| | | | 701/1 |
| 2014/0338298 A1 | 11/2014 | Jung et al. | |
| 2015/0105984 A1 | 4/2015 | Birrell et al. | |
| 2015/0124054 A1 | 5/2015 | Darr et al. | |
| 2015/0242799 A1 | 8/2015 | Seki et al. | |
| 2015/0243114 A1 | 8/2015 | Tanabe et al. | |
| 2015/0262351 A1 | 9/2015 | Dima | |
| 2015/0264863 A1 | 9/2015 | Muench et al. | |
| 2015/0305238 A1 | 10/2015 | Klausmann et al. | |
| 2015/0305239 A1 | 10/2015 | Jung et al. | |
| 2015/0362904 A1 * | 12/2015 | Scrivner | A01D 41/127 |
| | | | 700/275 |
| 2016/0029558 A1 | 2/2016 | Dybro et al. | |
| 2016/0084813 A1 | 3/2016 | Anderson et al. | |
| 2016/0084987 A1 | 3/2016 | Dybro et al. | |
| 2016/0106038 A1 | 4/2016 | Boyd et al. | |
| 2016/0215994 A1 | 7/2016 | Mewes et al. | |
| 2016/0330906 A1 | 11/2016 | Acheson et al. | |
| 2017/0042088 A1 | 2/2017 | Nykamp et al. | |
| 2017/0055446 A1 | 3/2017 | Nykamp et al. | |
| 2017/0089742 A1 | 3/2017 | Bruns et al. | |
| 2017/0118915 A1 | 5/2017 | Middelberg et al. | |
| 2017/0185086 A1 | 6/2017 | Sauder et al. | |
| 2017/0215330 A1 | 8/2017 | Missotten et al. | |
| 2017/0251600 A1 | 9/2017 | Anderson et al. | |
| 2017/0318743 A1 | 11/2017 | Sauder et al. | |
| 2018/0164471 A1 * | 6/2018 | Dybro | G01P 3/00 |
| 2018/0196441 A1 | 7/2018 | Muench et al. | |
| 2018/0211156 A1 | 7/2018 | Guan et al. | |
| 2018/0271015 A1 | 9/2018 | Redden et al. | |
| 2018/0325014 A1 | 11/2018 | Debbaut | |
| 2019/0021226 A1 * | 1/2019 | Dima | A01D 34/008 |
| 2019/0327892 A1 * | 10/2019 | Fries | A01D 57/03 |
| 2020/0020103 A1 | 1/2020 | Sneyders et al. | |
| 2021/0015040 A1 * | 1/2021 | Neitemeier | A01D 61/008 |
| 2022/0167557 A1 * | 6/2022 | Reiners | A01D 34/008 |

FOREIGN PATENT DOCUMENTS

| | | | | |
|---|---|---|---|---|
| DE | 2654141 A1 | 6/1978 | | |
| DE | 102005000771 A1 | 8/2006 | | |
| DE | 102016118637 A1 * | 4/2018 | | A01D 41/141 |
| EP | 3530099 A1 * | 8/2019 | | A01D 41/127 |
| EP | 3987913 A1 * | 4/2022 | | A01B 17/002 |
| WO | WO-8500268 A1 * | 1/1985 | | A01D 45/10 |
| WO | 2013120063 A1 | 8/2013 | | |
| WO | 2013120079 A1 | 8/2013 | | |
| WO | 2013141975 A2 | 9/2013 | | |
| WO | 2013162673 A2 | 10/2013 | | |
| WO | 2013184178 A2 | 12/2013 | | |
| WO | 2014093814 A1 | 6/2014 | | |
| WO | WO-2022003461 A1 * | 1/2022 | | A01D 41/141 |
| WO | WO-2022018656 A1 * | 1/2022 | | A01D 45/10 |

OTHER PUBLICATIONS

Canta et al., "Measuring height of sugarcane plants through LiDAR technology," Proceedings of the 13th International Conference on Precision Agriculture, 2016, pp. 1-13.

Inter-American Development Bank, "What is the precision agriculture? Why it is a likely answer to climate change and food security?" <https://www.youtube.com/watch?v=581Kx8wzTMc> Nov. 28, 2017.

Lee, "Why experts believe cheaper, better lidar is right around the corner," <https://arstechnica.com/cars/2018/01/driving-around-without-a-driver-lidar-technology-explained/> Jan. 1, 2018.

Pei, "11 Myths About LiDAR Technology," <https://www.electronicdesign.com/markets/automotive/article/21807556/11-myths-about-lidar-technology> Feb. 7, 2019.

Saracco, "LiDAR is Getting Cheaper," <https://cmte.ieee.org/futuredirections/2019/07/16/lidar-is-getting-cheaper/> Jul. 16, 2019.

* cited by examiner

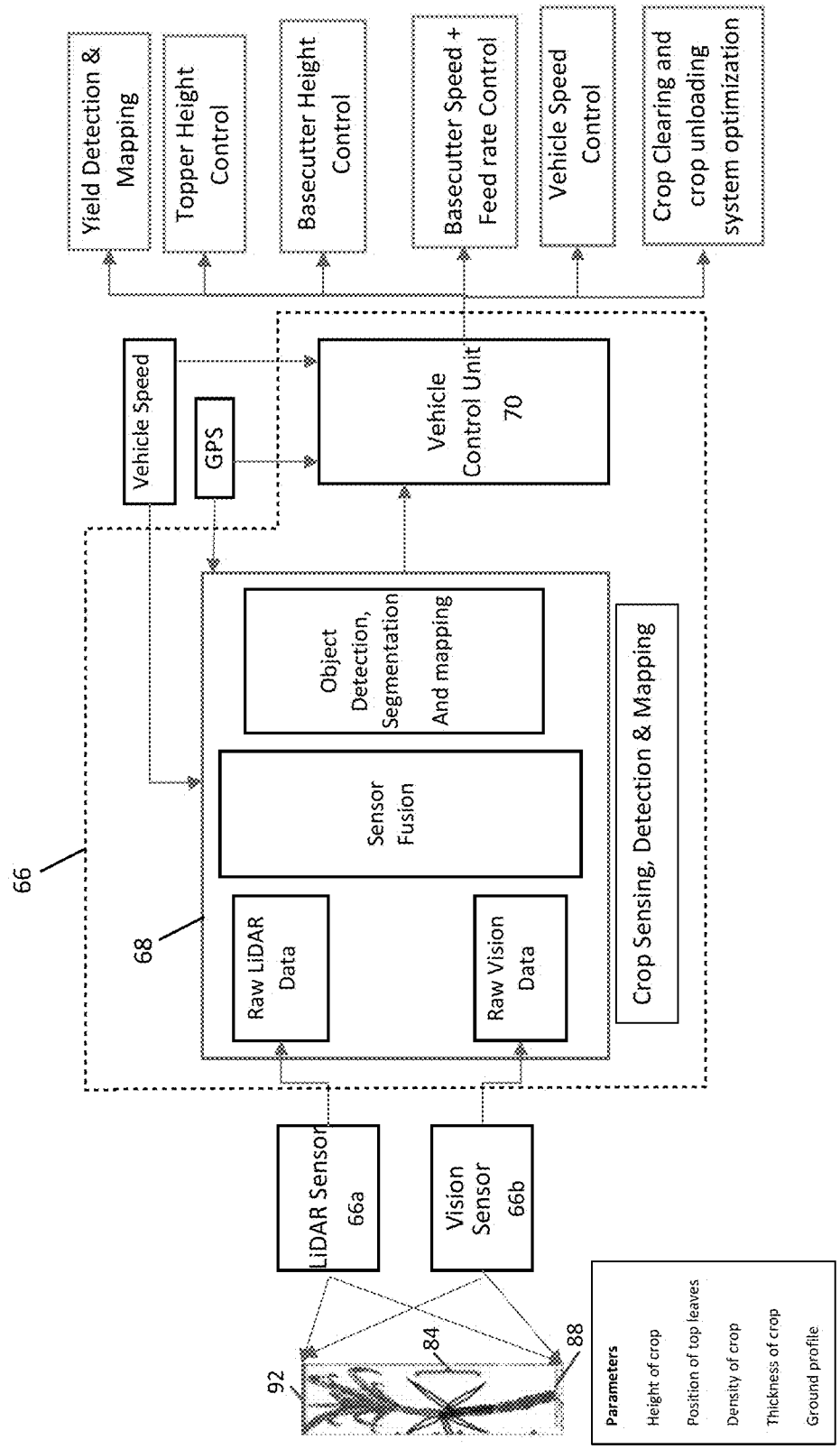

HARVESTER CROP MAPPING

CROSS REFERENCE TO RELATED APPLICATION

This application is a continuation-in-part of U.S. application Ser. No. 15/882,907 filed Jan. 29, 2018, the contents of which are herein incorporated by reference.

BACKGROUND

The present disclosure relates to crop mapping and location prediction.

SUMMARY

In one embodiment, the disclosure provides a control system of a harvester that harvests a crop including a plurality of crop stalks. Each of the crop stalks has a bottom portion and a top portion. The bottom portion extends between a lower end adjacent roots and a ground surface and an upper end adjacent the top portion. The harvester includes a topper that cuts the stalks between the top portion of the stalk and the bottom portion of the stalk and a base cutter that cuts the stalks near a ground surface between the bottom portion of the stalk and the roots to separate the bottom portion from roots. The control system includes at least one sensor and a controller that sends and receives signals. The at least one sensor senses a first height between the upper end of the bottom portion and the ground surface for each of the plurality of stalks, and senses a second height between the lower end of the bottom portion and the ground surface for each of the plurality of stalks. The controller receives a signal representing the sensed first height from the at least one sensor, and receives a signal representing the sensed second height from the at least one sensor. The controller further determines an average first height for each of the plurality of stalks over a set time, and determines an average second height for each of the plurality of stalks over the set time. The controller further sends a first signal to the topper to cause movement of the topper to the average first height such that the topper is configured to cut the plurality of stalks adjacent the upper end of the bottom portion, and sends a second signal to the base cutter to cause movement of the base cutter to the average second height such that the base cutter is configured to cut the plurality of stalks adjacent a lower end of the bottom portion.

In another embodiment the disclosure provides a control system for a harvester that to harvests a crop including a plurality of crop stalks. Each of the crop stalks has a bottom portion and a top portion. The bottom portion extends between a lower end adjacent roots and a ground surface and an upper end adjacent the top portion. The harvester includes a topper that cuts the stalks between the top portion of the stalk and the bottom portion of the stalk and a base cutter that cuts the stalks near a ground surface between the bottom portion of the stalk and the roots to separate the bottom portion from roots. The control system includes at least one sensor and a processor. The at least one sensor senses a first height between the upper end of the bottom portion and the ground surface for each of the plurality of stalks, senses a second height between the lower end of the bottom portion and the ground surface for each of the plurality of stalks, senses a first distance between the harvester and the upper end of the bottom portion of each of the stalks, and senses a second distance between the harvester and the lower end of the bottom portion of the stalk. The processor receives a signal representing the sensed first height from the at least one sensor, and receives a signal representing the sensed second height from the at least one sensor. The processor further determines an average first height for each of the plurality of stalks over a set travel distance, and determines an average second height for each of the plurality of stalks over the set travel distance. The processor further sends a first signal to a topper to cause movement of the topper to the average first height such that the topper is configured to cut the plurality of stalks adjacent the upper end of the bottom portion, and sends a second signal to a base cutter to cause movement of the base cutter to the average second height such that the base cutter is configured to cut the plurality of stalks adjacent a lower end of the bottom portion.

Other aspects of the disclosure will become apparent by consideration of the detailed description and accompanying drawings.

BRIEF DESCRIPTION OF THE DRAWINGS

FIG. 4 is a flow chart of operations according to some embodiments.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
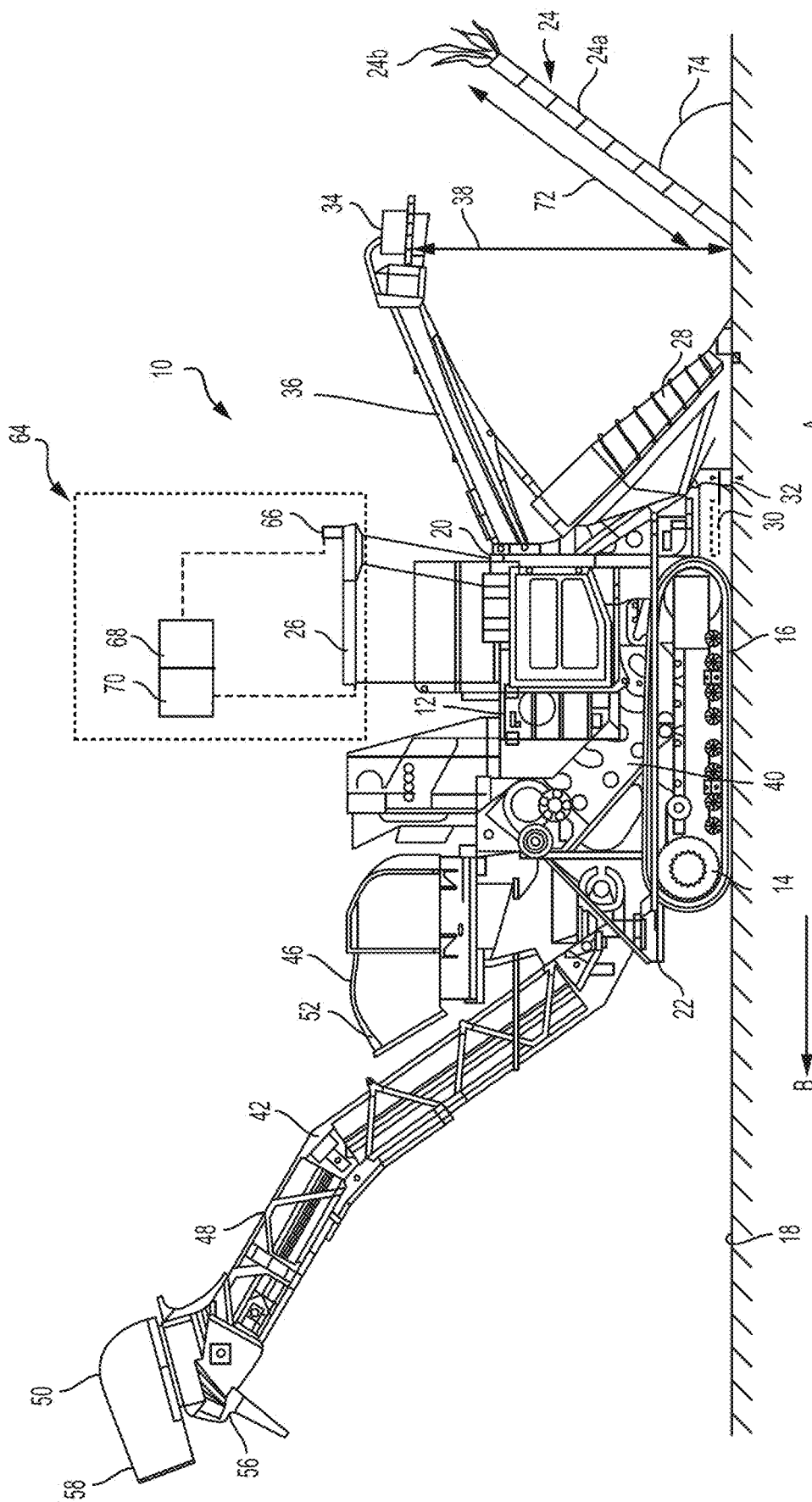
FIG. 1 is a side view of a harvester according to some embodiments.
Figure 2:
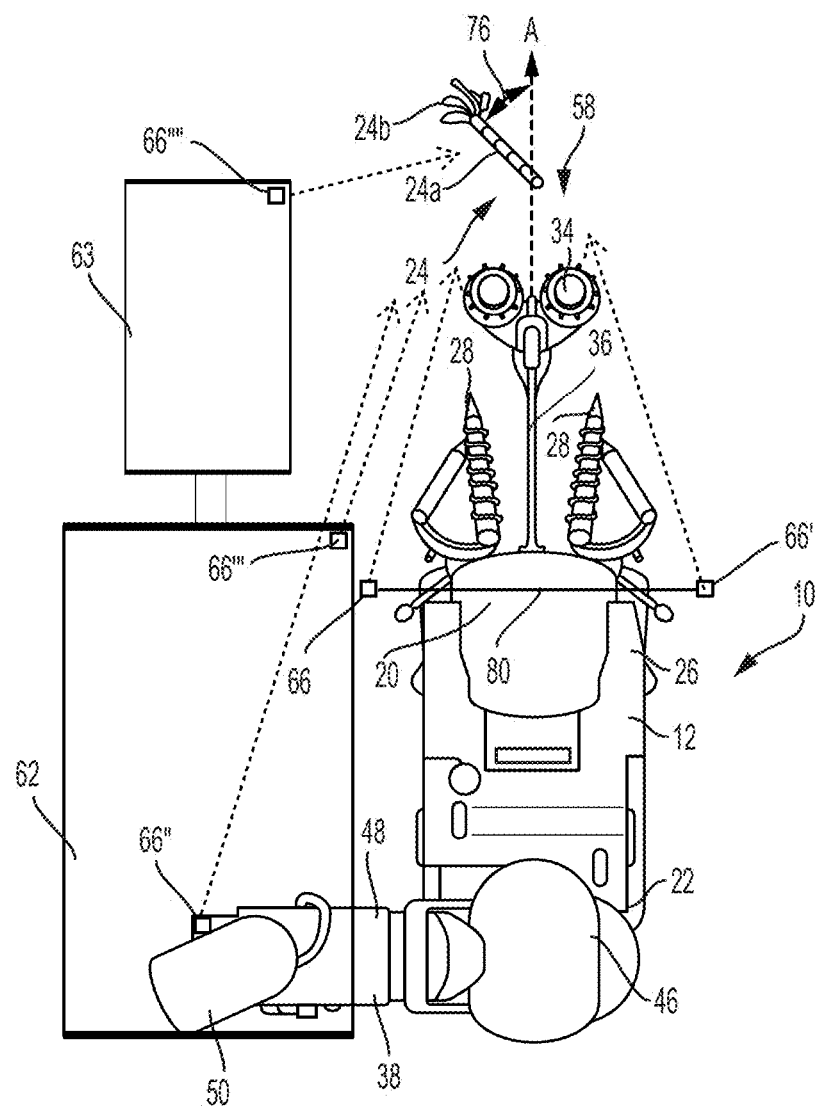
FIG. 2 is a top schematic view of the harvester and a wagon alongside the harvester.

FIGS. 1 and 2 illustrate a harvester 10, such as a sugarcane chopper harvester, including a main frame 12 supported on wheels 14 having continuous tracks 16, tires, or other traction devices that engage a support surface 18 (e.g., the ground or field). The tracks 16 interact directly with the ground surface 18 and are responsible for harvester 10 movement and tractive effort in a direction of travel. In other embodiments, the harvester 10 is provided with wheels having tires (rather than tracks as illustrated). During operation, the harvester 10 travels in a forward direction of travel A towards un-cut crop 24 in an un-harvested area of the field 18. A front 20 of the harvester 10 generally faces into the forward direction of travel A, while a rear 22 of the harvester 10 is generally opposite the front 20 and generally faces a rearward direction B, away from the forward direction A, towards a harvested area of the field 18. An operator's cab 26 is mounted on the frame 12 and contains a seat (not shown) for an operator. In some embodiments, other harvesters can be utilized in place of the illustrated sugar cane harvester 10.

The un-cut crop 24 includes a bottom portion or stalk 24a and a top portion or top 24b. The stalk 24a extends from a lower end adjacent roots in the field 18 to an upper end adjacent the top 24b. A pair of crop lifters 28 having side by side augers or scrolls is mounted to the front 20 of the frame 12 and operate on opposite sides of a row of crop to be harvested.

A base cutter 30 includes counter-rotating discs which cut near the lower end of the stalk 24a close to the ground surface 18. The discs of the base cutter 30 are positioned a base cutter height 32 above the ground surface 18. The base cutter height 32 is adjustable by raising and lowering the base cutter 30.

A topper 34 extends from the front 20 of the frame 12 on a boom 36. The topper 34 cuts the crop 24 generally between the stalk 24a and the top 24b. The illustrated topper 34 includes two counter-rotating wheels configured to cut the crop 24 (see FIG. 2). In some embodiments, three counter-rotating wheels are utilized. The boom 36 extends forwardly from the front 20 of the frame 12 to position the topper 34 at a topper height 38 with respect to the ground surface 18. The topper height 38 is adjustable such that the topper 34 is moveable with respect to the ground surface 18.

The harvester 10 also includes a processing assembly 40. The processing assembly 40 can include a chopper that cuts the crop inside the harvester 10, and a separator that receives the cut crop from the chopper and generally separates the cut crop. The chopper may include counter-rotating drum cutters (not shown) with overlapping blades for cutting stalks of crop, such as sugarcane, into billets, which are cut pieces of the stalk. In other constructions, the chopper may include any suitable blade or blades for cutting the stalks of crop. In general, the crop may include sugarcane or any other type of plant, and the cut crop may include billets and extraneous leafy matter. The chopper directs a stream of the cut crop (cut stalks, or billets, along with cut extraneous plant matter) to the unloading assembly 42.

The unloading assembly 42 is coupled to the frame 12 and located downstream of the processing assembly 40 for receiving cut crop from the processing assembly 40. The illustrated unloading assembly 42 includes a primary extractor 46, an elevator 48, and a secondary extractor 50.

The primary extractor 46 includes a primary hood 52 that has a domed shape, or other suitable shape, and includes an opening angled out from the harvester 10 and facing slightly down onto the ground surface 18. The primary hood 52 can be pivoted to direct the leaves to the headland or previously-harvested portion of the field 18. The primary extractor 46 also includes a primary fan (not shown) which is configured to separate any leafy matter from the stalks and direct the leafy matter out of the primary hood 52 onto the ground surface 18.

The elevator 48 is coupled to the frame 12 for receiving cleaned crop from the processing assembly 40. The elevator 48 terminates at a discharge 56 elevated to a height suitable for discharging cleaned crop into a collection receptacle of a vessel 62 (see FIG. 2) following alongside the harvester 10. In some embodiments, the elevator 48 is a conveyor that includes a plurality of slats to move crops up the conveyor. In some embodiments, the elevator 48 is an auger.

The secondary extractor 50 is coupled to the elevator 48 and is configured to discharge any remaining leafy material positioned on the elevator 48 before reaching the material outlet 56. In the illustrated implementation, the secondary extractor 50 includes a secondary hood 58 that is rotatable with respect to the elevator 48 to direct and discharge a portion of the separated crop (e.g., extraneous leafy matter) onto the field 18 instead of into the vessel 62. The secondary extractor 50 also includes a secondary fan (not shown) configured to facilitate separation of the crop (e.g., the leafy matter from the billets) and to discharge the leafy matter onto the field 18.

The harvester 10 further includes a control system 64 that includes at least one sensor 66, a processor 68 and a controller 70. The at least one sensor 66 is in electrical communication with the processor 68 to send signals to the processor 68. The at least one sensor 66 includes one or more of a vision sensor and a light detection and ranging (LiDAR) sensor. In some embodiments, both a vision sensor and a LiDAR sensor are utilized.

The controller 70 is in electrical communication with various components of the harvester 10, such as the base cutter 30 and the topper 34. The controller 70 is configured to send appropriate signals to the base cutter 30 to change the base cutter height 32, and the controller 70 is configured to send appropriate signals to the topper 34 to adjust the topper height 38.

With reference to FIGS. 1 and 2, the at least one sensor 66 is configured to detect various attributes of the un-cut crop 24. The detected attributes of the un-cut crop 24 may include, among other things, the stalk height 72, the lay angle 74, and the lay orientation 76. For the purposes of this application, the lay angle 74 of the un-cut crop 24 includes the angle formed between the stalk 24a of the un-cut crop 24 and the ground surface 18 and is configured to quantify how "upright" the stalk 24a is standing relative thereto. For example, a stalk 24a lying flat on the ground surface 18 defines a lay angle 74 of 0 degrees while a stalk 24a standing perfectly upright defines a lay angle 74 of 90 degrees. Furthermore, the lay orientation 76 of the un-cut crop 24 includes the angle formed between the vertical projection of the stalk 24a onto the ground surface 18 and the direction of travel A (see FIG. 2). The lay orientation 76 is configured to measure the direction in which the stalk 24a of the un-cut crop 24 is tilted. For example, a stalk 24a that is tilted parallel to the direction of travel A defines a lay orientation 76 of 0 degrees while a stalk 24a that is angled toward the port side of the harvester 10 (as shown in FIG. 2) defines a negative lay orientation 76. While not shown, a stalk 24a that is angled toward the starboard side of the harvester 10 defines a positive lay orientation 76. Finally, the stalk height 72 of the un-cut crop 24 includes the length of the stalks 24a of the un-cut crop 24.

The processor 68 compares the sensed orientation of the un-cut crop 24 to a range of acceptable orientations. If the sensed orientation of the un-cut crop 24 is down, for example, at a relatively small angle with respect to the ground surface, the sensed orientation is outside a range of acceptable orientations. If the sensed orientation is outside a range of acceptable orientations, the controller 70 sends a signal to the topper 34 to deactivate the topper 34.

With reference to FIG. 2, the harvester 10 is configured to travel in the harvesting direction A. The at least one sensor 66 is illustrated on a left side of the operator's cab 26 spaced from a centerline of the harvester 10 extending in the harvesting direction A. The at least one sensor 66 is slidably mounted on a bar 80 to permit the sensor 66 to be moved to the right side of the operator's cab 26 as indicated by sensor 66'. The sensor 66 can be moved by the operator within the operator's cab 26 between the position of sensor 66 and the position of sensor 66'.

In some embodiments, the at least one sensor 66 is mounted on an upper portion of the elevator 48 as indicated by identifier 66". In some embodiments, the at least one sensor 66 is mounted on the wagon 62 as indicated by identifier 66'''. The illustrated wagon 62 is pulled by a separate vehicle, such as a tractor 63. In some embodiments, a sensor 66'''' is mounted to a front portion of the tractor 63. Each of the sensors 66, 66', 66", 66''' and 66'''' are mounted with a clear line of sight of the un-cut crop 24 as indicated by dotted arrows. Various combinations of these mounting locations can be utilized in any given application. Other mounting locations are also possible in other embodiments.

Figure 3:
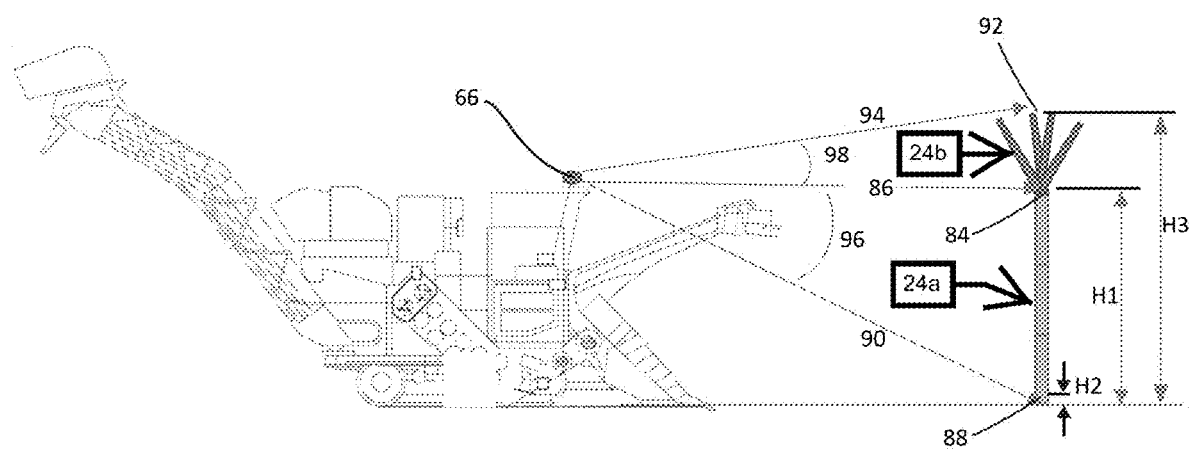
FIG. 3 is side schematic view of the harvester including various point of reference.

With reference to FIG. 3, the sensor 66 detects a first location 84 along the un-cut crop 24 between the upper portion of the stalk 24a and the top 24b and a first distance 86 between the location 84 and the harvester 10. The sensor 66 also detects a second location 88 of the bottom of the stalk 24a and a second distance 90 between the location 88 and the harvester. The sensor 66 also detects a third location 92 at the upper end of the top 24b and a third distance between the third location 92 and the harvester 10. The sensor 66 further detects a first angle 96 between the vectors for the first and second distances 86 and 90 and a second angle 98 between the vectors for the second and third distances 90 and 94. The at least one sensor 66 also senses a profile of the ground surface 18.

The sensor 66 communicates all of the sensed attributes to the processor 68. The processor 68 calculates a first height H1 between the location 84 and the ground surface 18, a second height H2 between the location 88 and the ground surface 18, and an overall height H3 between a top of the un-cut crop 24 and the ground surface 18 based upon the sensed attributes.

As shown in FIG. 4, a first sensor 66a is a LiDAR sensor and a second sensor is a vision sensor. The first and second sensors 66a, 66b are configured to sense various attributes of the un-cut crop 24, such as the locations 84, 88 and 92, the density of the un-cut crop 24, the thickness of the un-cut crop 24 and the profile of the ground surface 18. The first and second sensors 66a, 66b communicate the sensed attributes to the processor 68.

The processor 68 compiles all of the sensed attributes as well as data regarding vehicle speed and data from a global positioning system (GPS) and generates one or more maps of the crop including information related to a density of the crop and a thickness of the crop. The one or more generated map also include information related to an overall height of the crop, the first height H1 of the top portion of a group of stalks, and the second height H2 of the bottom portion of a group of stalks. The one or more generated maps additionally identify the first distance 86 between the first location 84 of each stalk of the group of stalks and the harvester 10, as well as the second distance 90 between the second location 88 of each stalk of the group of stalks and the harvester 10. The one or more generated maps also identify the stalk height 72, the lay angle 74, and the lay orientation 76 of each stalk of the group of stalks.

The processor 68 utilizes the generated map(s) to determine an average first height $H1_{avg}$ over a set time period, and to determine an average second height $H2_{avg}$ over the set time period. In some embodiments, the set time period is based upon vehicle speed such that the average heights are calculated based upon a set travel distance.

The processor 68 is also configured to compute a predicted yield based upon at least the generated map and the vehicle speed. The predicted yield and the generated maps can be displayed to an operator in the operator's cab 26 to permit the operator to manually adjust various harvesting parameters.

The processor 68 communicates the generated map(s) and the predicted yield with the controller 70. The controller 70 is configured send a signal to the topper 34 to thereby cause movement of the topper 34 to the average first height $H1_{avg}$. The controller 70 is also configured to send a signal to the base cutter 30 to thereby cause movement of the base cutter 30 to the average second height $H2_{avg}$.

The controller 70 is also configured to send a signal to the base cutter 30 to adjust a rotational speed of the base cutter 30 based upon at least the crop density, thickness, vehicle speed and predicted yield.

The controller 70 is also configured to send a signal to the harvester 10 to thereby cause an adjustment of a speed of harvester 10 based upon the crop density and the crop thickness.

The controller 70 is also configured to send appropriate signals to various elements of the harvester 10 and provide appropriate notifications to the operator to optimize operation of the harvester 10.

The sensors 66a, 66b, the processor 68 and the controller 70 continually work during the harvesting process to adjust the height of the base cutter 30 and the height of the topper 34 automatically to the respective average height $H1_{avg}$, $H2_{avg}$ to optimize operation of the harvester 10.

What is claimed is:

1. A control system of a harvester configured to harvest a crop including a plurality of crop stalks, each of the crop stalks having a bottom portion and a top portion, the bottom portion extending between a lower end adjacent roots and a ground surface and an upper end adjacent the top portion, the harvester including a topper configured to cut the stalks between the top portion of the stalk and the bottom portion of the stalk and a base cutter configured to cut the stalks near the ground surface between the bottom portion of the stalk and the roots to separate the bottom portion from roots, the control system comprising:
    at least one sensor configured to
        sense a first height between the upper end of the bottom portion and the ground surface for each of the plurality of stalks, and
        sense a second height between a lower end of the bottom portion and the ground surface for each of the plurality of stalks, and
    a controller configured to send and receive signals, the controller configured to
        receive a signal representing the sensed first height from the at least one sensor,
        receive a signal representing the sensed second height from the at least one sensor,
        determine an average first height for each of the plurality of stalks over a set time,
        determine an average second height for each of the plurality of stalks over the set time,
        send a first signal to the topper to cause movement of the topper to the average first height such that the topper is configured to cut the plurality of stalks adjacent the upper end of the bottom portion, and
        send a second signal to the base cutter to cause movement of the base cutter to the average second height such that the base cutter is configured to cut the plurality of stalks adjacent the lower end of the bottom portion.

2. The control system of claim 1, wherein the at least one sensor is further configured to sense a density of the crop over the set time and communicate a signal representing the sensed density to the controller, and wherein the controller is further configured to receive the signal representing the sensed density, generate a density map of the crop, and send a signal to the harvester to thereby adjust a speed of the harvester in response to the density map of the crop.

3. The control system of claim 2, wherein the at least one sensor is further configured to sense a thickness of the crop over the set time and communicate the sensed thickness to the controller, and the controller is further configured to receive the sensed thickness and generate a thickness map of the crop, and to send a signal to the harvester to thereby adjust a speed of the harvester in response to generated thickness map of the crop.

4. The control system of claim 1, wherein the at least one sensor is further configured to sense a thickness of the crop over the set time and communicate the sensed thickness to the controller, wherein the controller is further configured to determine a predicted throughput of the crop and to send a signal to the harvester to thereby adjust a speed of rotation of the base cutter in response to the predicted throughput of the crop.

5. The control system of claim 1, wherein the at least one sensor is further configured to sense a density of the crop over the set time and communicate the sensed density to the controller, wherein the controller is further configured to determine a predicted yield of the crop and to send a signal to the harvester to thereby adjust a speed of rotation of the base cutter in response to the predicted yield of the crop.

6. The control system of claim 1, wherein the at least one sensor is configured to sense an orientation of each of the stalks with respect to the ground surface and to communicate the sensed orientations to the controller,
wherein the controller is configured to determine if the sensed orientation is outside a range of acceptable orientations, and if the sensed orientation is outside the range of acceptable orientations, the controller is configured to send a third signal to the topper to deactivate the topper.

7. The control system of claim 1, wherein the harvester is configured to travel in a harvesting direction and includes a centerline extending in the harvesting direction, the harvester includes a first portion positioned on a first side of the centerline and a second portion positioned on a second side of the centerline opposite the first side, the at least one sensor is configured to be mounted on the first portion spaced from the centerline.

8. The control system of claim 1, wherein the at least one sensor includes a vision sensor and a light detection and ranging (LiDAR) sensor, the vision sensor and the LiDAR sensor both configured to obtain data regarding the location and density of the crop, and
wherein the controller is configured to receive input from both the vision sensor and the LiDAR sensor and generate a map of the crop including information related to an overall height of the crop, the first height of the top portion of the stalk, and the second height of the bottom portion of the stalk.

9. The control system of claim 8, wherein the generated map of the crop further includes information related to a density of the crop and a thickness of the crop, and
wherein the generated map of the crop further identifies a first distance between the upper end of the bottom portion of each of the stalks and a second distance between the harvester and the lower end of the bottom portion of the stalk.

10. The control system of claim 1, wherein the at least one sensor is configured to move to a first position while the crop is positioned on a first side of the harvester and to second position while the crop is positioned on a second side of the harvester.

11. A control system for a harvester configured to harvest a crop including a plurality of crop stalks, each of the crop stalks having a bottom portion and a top portion, the bottom portion extending between a lower end adjacent roots and a ground surface and an upper end adjacent the top portion, the harvester including a topper configured to cut the stalks between the top portion of the stalk and the bottom portion of the stalk and a base cutter configured to cut the stalks near the ground surface between the bottom portion of the stalk and the roots to separate the bottom portion from roots, the control system comprising:
at least one sensor configured to
sense a first height between the upper end of the bottom portion and the ground surface for each of the plurality of stalks,
sense a second height between a lower end of the bottom portion and the ground surface for each of the plurality of stalks,
sense a first distance between the harvester and the upper end of the bottom portion of each of the stalks, and
sense a second distance between the harvester and the lower end of the bottom portion of the stalk, and
a processor configured to
receive a signal representing the sensed first height from the at least one sensor,
receive a signal representing the sensed second height from the at least one sensor,
determine an average first height for each of the plurality of stalks over a set travel distance,
determine an average second height for each of the plurality of stalks over the set travel distance,
send a first signal to the topper to cause movement of the topper to the average first height such that the topper is configured to cut the plurality of stalks adjacent the upper end of the bottom portion, and
send a second signal to the base cutter to cause movement of the base cutter to the average second height such that the base cutter is configured to cut the plurality of stalks adjacent the lower end of the bottom portion.

12. The control system of claim 11, wherein the at least one sensor is further configured to sense a density of the crop over the set travel distance and communicate the sensed density to the processor, and the processor is further configured to receive the sensed density and generate a density map of the crop, to send a signal to the harvester to thereby adjust a speed of the harvester in response to generated map of the crop.

13. The control system of claim 12, wherein the at least one sensor is further configured to sense a thickness of the crop over the set travel distance and communicate the sensed thickness to the processor, and the processor is further configured to receive the sensed thickness and generate a thickness map of the crop, and to send a signal to the harvester to thereby adjust a speed of the harvester in response to generated thickness map of the crop.

14. The control system of claim 11, wherein the at least one sensor is further configured to sense a thickness of the crop over the set travel distance and communicate the sensed thickness to the processor, wherein the processor is further configured to determine a predicted throughput of the crop and to send a signal to the harvester to thereby adjust a speed of rotation of the base cutter in response to the predicted throughput of the crop.

15. The control system of claim 14, wherein the at least one sensor is further configured to sense a density of the crop over the set travel distance and communicate the sensed density to the processor, wherein the processor is further configured to determine a predicted yield of the crop and to send a signal to the harvester to thereby adjust a speed of rotation of the base cutter in response to the predicted yield of the crop.

16. The control system of claim 11, wherein the at least one sensor is configured to sense an orientation of each of the stalks with respect to the ground surface and to communicate the sensed orientations to the processor, and wherein the processor is configured to determine if the sensed orientation is outside a range of acceptable orientations, and if the sensed orientation is outside the range of acceptable orientations, the processor is configured to send a third signal to the topper to deactivate the topper.

17. The control system of claim 16, wherein the harvester is configured to travel in a harvesting direction and to deliver the crop to a wagon positioned near the harvester and traveling in the harvesting direction with the harvester, the at least one sensor is configured to be mounted to the wagon.

18. The control system of claim 11, wherein the at least one sensor includes a vision sensor and a light detection and ranging (LiDAR) sensor, the vision sensor and the LiDAR sensor are both configured to obtain data regarding the location and density of the crop, and wherein the processor is configured to receive input from both the vision sensor and the LiDAR sensor, and the processor is configured to generate a map of the crop including an overall height of the crop, the first height of the top portion of the stalk, the second height of the bottom portion of the stalk.

19. The control system of claim 18, wherein the generated map of the crop further includes a density of the crop, and a thickness of each stalk of the crop, and wherein the generated map of the crop further identifies the first distance between the harvester and the upper end of the bottom portion of each of the stalks and the second distance between the harvester and the lower end of the bottom portion of the stalk.

20. The control system of claim 11, wherein the at least one sensor is configured to move between a first position while the crop is positioned on a first side of the harvester and second position while the crop is positioned on a second side of the harvester.

* * * * *